United States Patent [19]
Higashi et al.

[11] Patent Number: 6,091,874
[45] Date of Patent: Jul. 18, 2000

[54] FLEXIBLE OPTICAL WAVEGUIDE DEVICE AND PROCESS FOR THE PRODUCTION THEREOF

[75] Inventors: Kensaku Higashi, Shizuoka; Michio Ohba, Tokyo; Yasunari Kawabata, Tokyo; Kuniaki Jinnai, Tokyo, all of Japan

[73] Assignees: Tomoegawa Paper Co., Ltd.; Mitsubishi Gas Chemical Company, Inc., both of Tokyo, Japan

[21] Appl. No.: 09/115,183

[22] Filed: Jul. 14, 1998

[30] Foreign Application Priority Data

Jul. 14, 1997 [JP] Japan .................................. 9-205248

[51] Int. Cl.⁷ ........................................ G02B 6/10
[52] U.S. Cl. ...................... 385/130; 385/131; 385/132; 385/14
[58] Field of Search ................................ 385/130–132, 385/14, 25, 4

[56] References Cited

U.S. PATENT DOCUMENTS 4,365,862  12/1982  Terui et al. .............................. 385/14

*Primary Examiner*—Phan T. H. Palmer
*Attorney, Agent, or Firm*—Wenderoth, Lind & Ponack, L.L.P.

[57] ABSTRACT

A flexible polymer optical waveguide device which is excellent in mechanical strength and durability against environments, particularly excellent in heat and chemical resistance, with maintaining characteristics of an optical waveguide and which can be easily produced, and a process for the production thereof, the flexible optical waveguide device having a structure in which a cured resin layer is formed on at least one surface of an optical waveguide film obtained by forming a refractive index distribution in a light-permeable polymer film, the cured resin layer(s) comprising a polyamide resin and at least one of an epoxy resin and a phenolic resin as main components.

12 Claims, 1 Drawing Sheet

FLEXIBLE OPTICAL WAVEGUIDE DEVICE AND PROCESS FOR THE PRODUCTION THEREOF

FIELD OF THE INVENTION

The present invention relates to an optical waveguide element, more specifically to an optical waveguide device which has excellent mechanical strength and durability against environments, particularly the device has excellent heat and chemical resistance, while maintaining the characteristics of an optical waveguide. In addition, the device can be easily protected. A process for the production of the optical waveguide device is part of the invention.

PRIOR ART

With the practical application of an optical communication system using low-loss optical fibers, the developments of light-emitting and light receiving elements such as a laser, etc., and connectors, switches, and the like have advanced, and there is demanded an optical circuit patterning technology for mounting these optical parts with high accuracy and in a high density. Further, connections between machines, such as computers and electronic switchboards, and connections within a board or between boards in devices or machines are shifting from conventional electric connections to optical interconnections. As a technique for materializing the above demands, an optical flat waveguide technique is attracting attention. Quartz-based materials having features of a small optical transmission loss and a wide transmission band have been mainly studied, and the practical use thereof is beginning. However, the quartz-based materials are poor in flexibility, and their production requires high temperatures and further it is difficult to form a larger area thereof.

In contrast, although polymer optical waveguides formed of polymethyl methacrylate, polystyrene, polyester, polyimide, an epoxy resin, and silicone resin, etc., are poor in optical loss and heat resistance as compared with a quartz-based optical waveguide, they have advantages that they are flexible, relatively easy to produce and advantageous for forming a large area. Many proposals have been so far made. In the method of the above polymer optical waveguides, solutions of polymer materials for forming a cladding layer and a core layer are applied onto a substrate by spin coating, etc. In order to form a core portion, patterning is carried out in the core layer by a conventional method, and these layers are peeled off from the substrate. In this method, however, there occurs an intermixing phenomenon that when the other layer is formed on the cladding layer or the core layer, part of an under layer is dissolved by a solvent of the polymer solution for the other layer to cause the crystallization of a polymer or a mismatch in an interface between the core and the clad. As a result, an optical loss caused by scattering increases. For preventing the above problem, attempts have been made to incorporate a curable material into the under layer or to cure a material of the under layer under heat at a high temperature. In this case, however, an internal stress increases due to a curing-induced shrinkage or a thermal expansion difference, which also results in a problem that the optical loss increases.

When a polymer optical waveguide is used for optical interconnection, it is required to improve a conventional polymer optical waveguide in mechanical strength and durability against temperature, humidity, light and chemicals. For the improvement, generally, a cladding layer having a large thickness can be formed from a material having durability under the above conditions.

However, so long as a solution of a polymer in a solvent is used, heating for a long period of time is required for volatilizing the solvent, which is disadvantageous for production by reason of the above intermixing phenomenon and the above internal stress.

JP-B-56-3522 discloses a selective photopolymerization method to produce a polymer optical waveguide, which method does not include coating with a polymer solution as an essential requirement. In this method, a matrix polymer (polycarbonate) containing a photo-polymerizable monomer (acrylic monomer) and a photo-polymerization initiator is formed into a film by a solvent casting method, the film is exposed to ultraviolet light to form a pattern and the unreacted monomer is removed by vacuum heating, to form a refractive index distribution in the film. The so-produced film has a structure in which it has no cladding layer on upper and lower surfaces. The above method is excellent in that an optical circuit having a relatively high performance can be easily produced at a low cost in a larger area. Since, however, the above film has low durability against organic solvents, it is not possible to produce a cladding layer which also has the function of surface protection by applying a polymer solution containing an organic solvent to the optical waveguide film.

On the other hand, an element can be formed by applying a solventless composition containing a polymer, an oligomer or a monomer having a crosslinkable functional group, a curing agent and a polymerization initiator in place of the above polymer solution and curing it with light or heat. The so-produced optical waveguide can be fully used at room temperature. However, the limit of its durability against high temperature is approximately 80° C., at the highest, therefore the range where it can be applied is limited. Further, since the above curable composition used for forming a device has a fluidity sufficient for coating or printing, it is difficult to maintain a shape formed immediately after the composition is applied on an optical waveguide film. It is therefore inevitably required to sandwich the polymer optical waveguide between rigid substrates such as glass substrates, etc., and no flexible optical waveguide device has been materialized.

SUMMARY OF THE INVENTION

It is an object of the present invention to provide a flexible optical waveguide device which has excellent mechanical strength and durability against temperatures, humidity, light and chemicals while maintaining the characteristics of an optical waveguide, and a process for the production thereof.

It is another object of the present invention to provide an optical waveguide device which can be produced at a low cost with ease and which can be also mass-produced even if it has a large area, and a process for the production thereof.

According to the present invention, there is provided a flexible optical waveguide device obtained by forming a refractive index distribution in a light-permeable polymer film to obtain an optical waveguide film and forming a cured resin layer on at least one surface of the optical waveguide film, the cured resin layer(s) comprises a polyamide resin and at least one of an epoxy resin and a phenolic resin as main components.

In one embodiment of the above optical waveguide device, a flexible substrate is further laminated on the surface of the cured resin layer formed on one surface of the optical waveguide film or further laminated on at least one of the cured resin layers formed on both surfaces of the optical waveguide film.

Further, according to the present invention, there is provided a process for the production of a flexible optical waveguide device, which comprises forming a resin layer being in an uncured or semi-cured state and having an adhesion property at room temperature or under heat on a releasable film or a flexible substrate, laminating the resin layer on at least one surface of an optical waveguide film by a laminating method, and curing the resin layer.

DETAILED DESCRIPTION OF THE INVENTION

The constituent requirements of the present invention will be explained in detail hereinafter.

Figure 1:
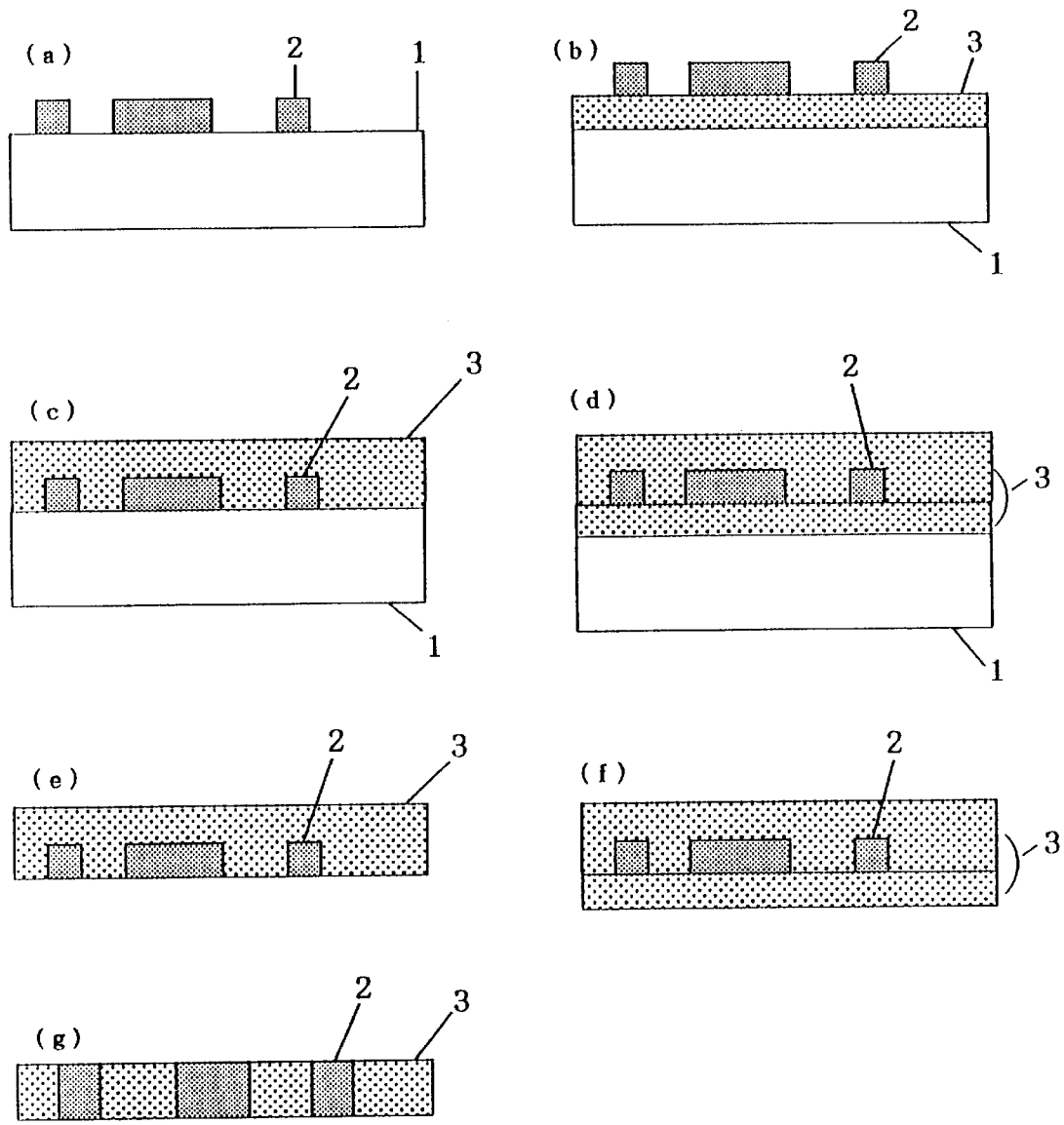
FIGS. 1(a–g) are schematic cross-sectional view showing a constitution of an optical waveguide film.

An optical waveguide film obtained by forming a refractive index distribution in a light-permeable polymer film, in the present invention, refers to a so-called polymer optical waveguide. The polymer film has a core portion forming an optical waveguide portion, as an essential component, and a layer having a cladding function is disposed on at least one side (surface) of the core portion as required. FIG. 1 illustrates the structure of an optical waveguide film that can be used in the present invention, while the present invention shall not be limited thereto.

In FIG. 1, (a) shows an optical waveguide film structured by forming a core 2 directly on a base film 1, and the base film also works as a clad. This structure corresponds to a structure obtained by removing a base film from a structure shown in the next (b). (b) shows an optical waveguide film structured by consecutively laminating a clad 3 and a core 2 on a base film 1. (c) shows a structure obtained by further forming a clad 3 in an upper portion of the structure shown in (a). Further, (d) shows a structure obtained by further forming a clad 3 in an upper portion of the structure shown in (b). (e) shows a structure obtained by removing the base film shown in (c), and (f) shows a structure obtained by removing the base film shown in (d). Further, (g) shows a structure in which a core 2 and a clad 3 are formed by providing a refractive index distribution in a film and upper and lower clads are not present.

The material for the optical waveguide film can be selected from resins such as polymethyl methacrylate, polystyrene, polycarbonate, polyimide, an epoxy resin and a silicone resin.

The present invention can be applied to many kinds of optical waveguide films formed by combining optical waveguide structures and materials. Particularly preferably, the present invention uses an optical waveguide film produced from polycarbonate whose waveguide pattern is manufactured by a selective photopolymerization method and structured as shown in (g) of FIG. 1.

In the present invention, the cured resin layer is formed of a main component containing a polyamide resin and at least one of an epoxy resin and a phenolic resin. Of these resins, the epoxy resin and the phenolic resin have the function of imparting adhesion properties, heat resistance, humidity resistance and chemical resistance. On the other hand, the polyamide resin is required for an adhesive property and flexibility and also for film-formability of a resin layer in a production process to be described later and a tackifying property, an adhesive property and a form-maintaining property at room temperature or under heat during laminating.

The epoxy resin can be selected from a bisphenol A type epoxy resin, a bisphenol F type epoxy resin, a biphenyl type epoxy resin, a phenol novolak type epoxy resin, a cresol novolak type epoxy resin, an alicyclic epoxy resin, a glycidyl ester type epoxy resin or glycidylamine type epoxy resin.

The phenolic resin includes resins obtained by condensation of phenols such as phenol, cresol, xylenol, resorcin, alkylphenol, vinylphenol and bisphenol and aldehydes such as formaldehyde and acetaldehyde. The above resins are largely classified into resol phenol resins and novolak phenol resins. In the present invention, of these resins, the resol phenol resins can be preferably used alone in combination with the polyamide resin. The novolak phenol resins can be preferably used together with the epoxy resin in combination with the polyamide resin.

The polyamide resin is obtained by thermal polymerization of a mixture of an acid and a diamine, and a polyamide resin soluble in mixed solvents containing an alcohol solvent can be used. A polyamide from dimeric acid is particularly preferred.

The above resins included in the epoxy resin, the phenolic resin or the polyamide resins may be used alone or in combination. Of the above resins, epoxy resin, resol phenol resin, a combination of an epoxy resin and a phenolic resin, a combination of an epoxy resin and a polyamide resin, or a combination of a resol phenolic resin and a polyamide resin undergo curing, and attain the object of the present invention by finally forming a complicated cured product. For improving a curing reaction of these, a curing agent and a cure promoter may be incorporated as required. These components for constituting the cured resin layer are adequately combined for allowing them to exhibit their characteristics and by taking care not to cause some component to remain without serving the curing at a curing step.

For the cured resin layer in the present invention, it is preferred to incorporate the polyamide resin in an amount of 20 to 80 parts by weight based on the total amount of the resin components. When the amount of the polyamide resin is greater than the above upper limit, the cured resin layer is poor in heat resistance. When the amount of the polyamide resin is smaller than the above lower limit, the film formability and the adhesion property during the laminating are insufficient.

The cured resin layer in the present invention is in an uncured or semi-cured state during the laminating, it has an adhesion property at room temperature or under heat, and it causes a curing reaction with light or heat after it is formed by the laminating. In the flexible waveguide element, the cured resin layer is in a cured state. The above resin layer which is in an uncured or semi-cured state is prepared in a state where a solvent is substantially not contained, by pre-applying the above materials for the cured resin layer on a releasable film as a substrate or a flexible substrate and fully drying a resultant film with light and/or heat. Further, the above film can be aged as required in order to decrease the content of components having low molecular weights to make it as small as possible, and it is therefore considered that the resin layer is free from impairing the optical waveguide characteristic, even when it is laminated on an optical waveguide film. The resin layer formed by applying the above materials on a releasable film or a flexible substrate in advance is laminated on an optical waveguide film by a method to be described later and then cured.

The condition of curing the resin layer laminated on an optical waveguide film with light and/or heat can be selected depending upon materials for the resin. As compared with a conventional case where a polymer solution is directly applied to an optical waveguide film to form a laminate, the heating temperature for the curing is low, and the heating time period, can be set for a small period since the resin layer has the above specific resin composition, and as a result, the internal stress caused by the curing can be made as small as possible. In the curing step in the present invention, a solvent and components having low molecular weights such as monomers, which transit from the above resin layer to an optical waveguide film, are in a very small in amount, and therefore, almost no degradation of optical waveguide characteristics is found.

The cured resin layer in the present invention has the above-described properties, and it can be therefore laminated directly on the core of an optical waveguide film having no clad in some portion. In this case, the cured resin layer also performs the function of a clad and is therefore required to be prepared having a lower refractive index than the core portion of an optical waveguide film. Further, it is required to adjust the refractive index depending upon the numerical aperture (NA) required of the optical waveguide device. Since the refractive index of a resin tends to increase when the resin is cured, the refractive indices of the resins should be fully studied before and after the resins are cured, for selecting the materials. Further, it is also required to select the above resins such that the cured resin layer substantially does not have any light absorption in a wavelength region of 0.5 to 1.55 $\mu$m, which is the wavelength region of light being transmitted through the core portion.

Further, from the viewpoint of heat resistance and humidity resistance, it is preferred to select the above resins which show no change in refractive index and light transmittance in environments where the flexible optical waveguide device is used and which show a dimensional change equal to, or slightly smaller than, the dimensional change which the optical waveguide film has depending upon changes in temperature and humidity.

In the present invention, the thickness of the cured resin layer can be adjusted depending upon the kind and the form of an optical waveguide film and the total thickness needed, while it is preferably in the range of from 3 to 300 $\mu$m. When the above thickness is smaller than 3 $\mu$m, it is difficult to attain a sufficient adhesion to an uneven surface of an under layer during the laminating. A thickness of more than 300 $\mu$m is useless, since not only it is difficult to form the cured resin layer, but also the flexibility, an object of the present invention, is impaired.

The flexible substrate used in the present invention can be selected from cloth, paper and non-woven fabric which are made of general synthetic fibers, heat-resistant high-strength fibers such as aramid fiber, carbon fiber, ceramic fiber and metal fibers of copper or stainless steel, and metal foils of aluminum, copper and stainless steel, so long as they do not affect optical waveguide characteristics. In view of compatibility with an optical waveguide film and the cured resin layer, a polymer film is preferred. While the polymer film is not specially limited, it is required to have mechanical strength and durability against heat and humidity to some extent depending upon use environments of the flexible optical waveguide device. Specifically, the polymer film includes films of polyethylene terephthalate, polyethylene naphthalate, polyvinyl chloride, polyallylate, polyether sulfone, polycarbonate, polyamide, polyimide, polyolefin, fluorine resin and etc. While the thickness of the polymer film is determined as required depending upon an optical waveguide film, the cured resin layer and an end in use, it is preferably approximately 3 to 300 $\mu$m. When the above thickness is less than 3 $\mu$m, no improvement in mechanical strength can be expected, and a crease is liable to occur so that lamination work during the production to be described later is difficult. When it is greater than 300 $\mu$m, the film itself has a extremely high rigidity, and it can no longer be said that the optical waveguide device as an object is flexible.

The process for the production of a flexible waveguide device, provided by the present invention, will be explained hereinafter.

The resin layer in an uncured or semi-cured state is formed on the releasable film or the flexible substrate by a conventional method. That is, materials for the resin layer are dissolved and/or dispersed in a solvent to prepare a coating composition or an ink, and the coating composition or the ink is allowed to adhere onto the releasable film or the flexible substrate by coating or printing. Then, the solvent is volatilized, and the resin layer is adjusted to a semi-cured state, as required. When the above coating composition containing a solvent is used, resin materials having a high molecular weight can be used as compared with a case where a solventless thermosetting epoxy resin composition or an acrylic light- or ultraviolet-light-curable resin is used. Further, there is an advantage that a resin layer having a predetermined uniform thickness can be easily obtained, since the resin layer is preferably formed by application with a coater, and the like.

The above resin layer is laminated on an optical waveguide film by a general laminating method. That is, a sheet having an adhesion property and a sheet which is to be attached are attached to each other with a general laminator having a combination of metal and rubber rolls or a combination of rubber and rubber rolls (pre-coat laminator). When the laminating is carried out, it is required to prevent the inclusion of a crease and air by adjusting the roll temperature and pressure, and it is necessary to avoid high temperatures and high pressures which deform the optical waveguide film and impair the characteristics of the optical waveguide film. In addition to the laminating method in which the two sheets are passed through a nip of two rolls, there may be employed a so-called vacuum attaching method in which two sheets to be attached are very closely faced to each other, once the pressure is reduced and then the two sheets are attached to each other by means of atmospheric pressure.

The specific attaching procedure differs depending upon the form of an intended flexible waveguide device, while typical steps thereof will be explained below.

<Method of producing flexible optical waveguide device formed by laminating cured resin layer on at least one surface of optical waveguide film>

A: (1) A resin layer in an uncured or semi-cured state, formed on a releasable film in advance, is laminated on an optical waveguide film by a laminating method.

(2) The releasable film is removed, and the resin layer is cured, or the resin layer is cured and the releasable film is removed.

<Method of producing flexible optical waveguide device formed by consecutively laminating cured resin layer and flexible substrate on optical waveguide film>

A: (1) A resin layer in an uncured or semi-cured state, formed on a releasable film in advance, is laminated on an optical waveguide film by a laminating method.

(2) The releasable film is removed.

(3) A flexible substrate is laminated on the resin layer in an uncured or semi-cured state on the optical waveguide film by a laminating method.

(4) The resin layer in an uncured or semi-cured state is cured.

B: (1) A resin layer in an uncured or semi-cured state, formed on a releasable film in advance, is laminated on a flexible substrate by a laminating method.

(2) The releasable film is removed.

(3) The resin layer in an uncured or semi-cured state on the flexible substrate is laminated on an optical waveguide film by a laminating method.

(4) The resin layer in an uncured or semi-cured state is cured.

C: (1) A resin layer in an uncured or semi-cured state, formed on a flexible substrate, is laminated on an optical waveguide film by a laminating method.

(2) The resin layer in an uncured or semi-cured state is cured.

EXAMPLES

The present invention will be more specifically explained concerning its constitution and effect with reference to Examples hereinafter, while Examples shall not limit the working mode of the present invention or the scope of the present invention.

(a) Design and preparation of photomask

Figure 2:
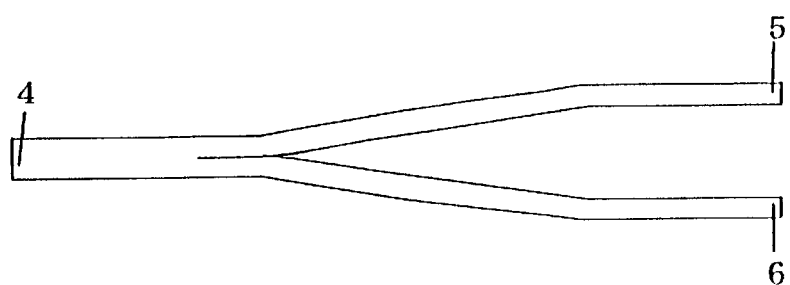
FIG. 2 is a schematically shown optical circuit pattern used in Examples and Comparative Examples.

An optical waveguide pattern as shown in FIG. 2 was designed as a two-branched optical waveguide having a core diameter of 62.5 $\mu$m and a clad diameter of 125 $\mu$m (to be abbreviated as 62.5/125) for GI optical fibers, and a quartz photomask was prepared. The optical waveguide had the following dimensions: Its length was 30 mm, an optical waveguide end portion 4 on an incident light side had an optical waveguide width of 50 $\mu$m, each of optical waveguide end portions 5 and 6 on a two-branched side had a width of 40 $\mu$m, and the optical waveguide end portions on the two-branched side had a pitch of 250 $\mu$m.

(b) Preparation of optical waveguide film

An optical waveguide film was prepared according to the selective photopolymerization method described in JP-B-56-3522. That is, a film containing a polycarbonate (trade name Iupilon Z, supplied by Mitsubishi Gas Chemical Co., Inc.) synthesized from bisphenol Z, methyl acrylate as a photo-polymerizable monomer and benzoin ethyl ether as a photo-polymerization initiator was prepared by a casting method, and the photomask prepared above was attached to the film. The resultant film was exposed to ultraviolet light to polymerize the methyl acrylate monomer in an exposed portion. Then, the methyl acrylate monomer in an unexposed portion was removed by vacuum-drying according to a conventional method, to give a 50 $\mu$m thick optical waveguide film having an unexposed portion formed of only polycarbonate (to constitute a core portion having a high refractive index, refractive index: 1.59) and an exposed portion formed of a mixture of polycarbonate and methyl acrylate monomer (to constitute a clad portion having a low refractive index, refractive index: 1.57).

(c) Method of measurement of excess loss

In the above-obtained optical waveguide device, Input/output ports were mentioned as shown in FIG. 2. The optical waveguide end portion 4 was insident side, and two-branched portions 5 and 6 were emission side.

A light source of LED (Light Emission Diode) having a wavelength of 0.85 $\mu$m was connected to the optical waveguide end portion 4 on the incident light side through a 62.5/125 GI optical fiber, and light was emitted. Light coming from the optical waveguide end portions 5 and 6 on an outgoing light side was consecutively introduced into an optical power meter through a 62.5/125 GI optical fiber, and an outgoing light intensity each (light intensity 1 and light intensity 2) was measured.

Further, the LED was connected through the same optical fiber directly to the optical power meter without the optical waveguide element, and light intensity was measured. The obtained light intensity was taken as the intensity of incident light into the optical waveguide.

On the basis of the above measurements, an excess loss was determined by the following equation.

Excess loss (dB)=$-10\times$Log((light intensity 1+light intensity 2)/incident light intensity)

Further, the measured optical waveguide device was allowed to stand in a constant-temperature chamber at 125° C. for 200 hours, and again measured for an excess loss.

Example 1

A coating composition containing the following components, for a cured resin layer, was applied onto a releasable film and dried to obtain a structure in which a resin layer having a dry thickness of 20 $\mu$m was laminated on the releasable film.

Terminal-amine-modified aliphatic polyamide resin solution (IPA/water mixed solvents, solid content 20%) 100 parts by weight Bisphenol A type resol phenol resin solution (methanol solvent, solid content 10%) 200 parts by weight The above resin layer formed on the releasable film was attached to each surface of the optical waveguide film prepared in the above (b) by a general laminating method using metal/rubber rolls (roll temperature 70° C.). The resultant laminate was heated at 60° C. for 84 hours and heated at 150° C. for 5 hours for curing the resin layer, and the releasable films were removed, then the resultant set was cut with a dicing saw to give a flexible optical waveguide device of the present invention. Each of the cured resin layers had a refractive index of 1.55.

Example 2

The same coating composition as that used in Example 1 was directly applied to a Kapton film having a thickness of 75 $\mu$m and dried to form a resin layer having a dry thickness of 23 $\mu$m. The resin layer was directly attached to each surface of the same optical waveguide film as that prepared in the above (b), and the resultant laminate was treated in the same manner as in Example 1 to give a flexible optical waveguide device of the present invention.

Example 3

A flexible optical waveguide device of the present invention was prepared in the same manner as in Example 1 except that the coating composition for a cured resin layer was replaced with a composition containing the following components. The cured resin layer had a refractive index of 1.54.

Terminal-amine-modified aliphatic polyamide resin solution (IPA/water mixed solvents, solid content 20%) 100 parts by weight Novolak phenol resin solution (methyl ethyl ketone solvent, solid content 50%) 20 parts by weight Bisphenol A type liquid epoxy resin solution (methanol solvent, solid content 20%) 200 parts by weight Comparative Example 1

A solution containing the same polycarbonate, the same photo-polyermizable monomer and the same photo-polymerization initiator as those used in the preparation of the above optical waveguide film was cast on a glass substrate, and the above photomask was used to obtain a 50 μm thick optical waveguide film adhering intimately to the glass substrate. A coating composition prepared by dissolving a bisphenol A type epoxy resin and an amine-containing curing agent in MIBK/toluene mixed solvents was applied onto the above optical waveguide film, and dried and cured under heat, and the resultant laminate was cut to prepare a comparative optical waveguide device. The cured epoxy resin layer formed on the optical waveguide film had a thickness of 15 μm and had a refractive index of 1.56.

Comparative Example 2

An acrylic ultraviolet-curable resin (free of solvent) wad dropped on the 50 μm thick optical waveguide film adhering intimately to the glass substrate, prepared in Comparative Example 1. A quartz plate having a thickness of 1 mm was carefully pressed thereon so as not to cause the inclusion of foams, and the resultant set was exposed to ultraviolet light to cure the resin, whereby a comparative optical waveguide element was obtained. The above ultraviolet-curable resin had a refractive index of 1.48 and a glass transition point of 129° C., and the cured resin layer had a thickness of 13 μm.

Comparative Example 3

There was prepared a comparative optical waveguide device having a structure in which a glass substrate was disposed on each surface of the same optical waveguide film as that prepared in the above (b) through a solventless thermosetting epoxy resin composition. The cured thermosetting epoxy resin composition had a refractive index of 1.56 and a glass transition point of 90° C. The thickness of the epoxy resin layer on each surface was not accurately measurable, and the total thickness of these two layers was 54 μm.

Comparative Example 4

An attempt was made to prepare a comparative flexible optical waveguide device in the same manner as in Example 1 except that the coating composition for the cured resin layer was replaced with a bisphenol A type resol phenolic resin solution (methanol/toluene mixed solvents, solid content 20%). However, the cured resin layer had an insufficient adhesion strength to the optical waveguide film so that it caused an interfacial separation during the cutting with a dicing saw, and the subsequent measurement of an excess loss was therefore not possible.

Comparative Example 5

A terminal-amine-modified aliphatic polyamide resin solution (IPA/water mixed solvents, solid content 20%) was applied to a releasable film and dried to obtain a structure in which a resin layer having a dry thickness of 25 μm was laminated on the releasable film. The resin layer formed on the releasable film was attached to each surface of the same optical waveguide film as that prepared in the above (b) by a general laminating method using metal/rubber rolls (roll temperature 100° C.). The releasable film was removed, and the resultant set was cut with a dicing saw to give a comparative flexible optical waveguide device. The above resin layer had a refractive index of 1.49.

The optical waveguide devices obtained in the above Examples and Comparative Examples were measured for an excess loss each according to the above (c), and Table 1 shows the results. As is clearly shown in Table 1, the flexible waveguide devices of the present invention were free of an increase in excess loss and had excellent characteristics. In addition, in Comparative Example 5, the measurement of an excess loss was possible at an initial stage, but the polyamide layer laminated on the optical waveguide film was melted in a constant-temperature chamber at 125° C. since it was not cured, so that the measurement thereafter was not possible.

TABLE 1

| | | Excess loss (dB) | | |
|---|---|---|---|---|
| | Constitution | Before heat-resistance test | After 125° C. 200 hours | Remarks |
| Ex. 1 | LM/PC/LM | 0.89 | 0.89 | |
| Ex. 2 | PI/LM/PC/LM/PI | 0.85 | 0.86 | |
| Ex. 3 | LM/PC/LM | 0.93 | 0.92 | |
| CEx. 1 | GL/PC/epoxy | 2.27 | 9.49 | Core form deformed |
| CEx. 2 | GL/PC/acryl/quartz | 0.90 | 3.54 | |
| CEx. 3 | GL/epoxy/PC eposy/GL | 1.04 | 4.16 | Form included partly |
| CEx. 5 | LM/PC/LM | 0.97 | — | AD melted at 125° C. |

Ex. = Example, CEx. = Comparative Example
PC: Polycarbonate optical waveguide film,
LM: Resin layer formed by laminating method,
PI: Polyimide film
GL: Glass substrate Effect of the Invention As explained above, in the present invention, a resin layer having a specific composition is formed on a substrate other than an optical waveguide film in advance, and the resin layer is laminated on the optical waveguide film by a laminating method. There can be therefore effectively prevented the deterioration of optical waveguide characteristics caused by the infiltration of components having a low molecular weight such as a solvent, a monomer, and the like, and the process for the production thereof is easy and excellent in productivity. Further, in particular, when an optical waveguide film produced by the selective photopolymerization method is used, the durability at a high temperature of 125° C. can be achieved.

What is claimed is:

1. A flexible optical waveguide device obtained by forming a refractive index distribution in a light-permeable polymer film to obtain an optical wave-guide film and forming a cured resin layer on at least one surface of the optical wave-guide film, the cured resin layer(s) comprising, as main components, a polyamide resin, and at least one member selected from the group consisting of an epoxy resin and a phenolic resin.

2. The flexible optical waveguide device according to claim 1, wherein a flexible substrate is further laminated on the surface of the cured resin layer formed on one surface of the optical waveguide film or further laminated on at least one of the cured resin layers formed on surfaces of the optical waveguide film.

3. The flexible optical waveguide device according to claim 2, wherein the flexible substrate is a polymer film.

4. The flexible optical waveguide device according to claim 1, wherein the optical waveguide film is a film produced by a selective polymerization method and at least one surface of the film has no cladding layer.

5. The flexible optical waveguide device according to claim 1, wherein the cured resin film comprises a polyamide resin and a phenolic resin.

6. The flexible optical waveguide device according to claim 1, wherein the cured resin film comprises a polyamide, an epoxy resin and a phenolic resin.

7. The flexible optical waveguide device according to claim 1, wherein the cured resin layer comprises 20 to 80 parts by weight, based on the total amount of the cured resin components, of the polyamide resin.

8. The flexible optical waveguide device according to claim 1, wherein the cured resin layer has a thickness in the range of 3 to 300 μm.

9. The flexible optical waveguide device according to claim 1, wherein the cured resin film comprising a polyamide resin and an epoxy resin.

10. A process for the production of a flexible optical waveguide device, which comprises forming a resin layer being in an uncured or semi-cured state which has an adhesion property at room temperature or under heat on a releasable film or a flexible substrate, laminating the resin layer on at least one surface of an optical waveguide film by a laminating method, and curing the resin layer.

11. A process according to claim 10, wherein the resin layer formed on the releasable film or the flexible substrate is dried until the resin layer is in a state where it substantially does not contain any solvent, before it is laminated.

12. The method of claim 10, wherein the resin layer comprises, as main components, a polyamide resin, and at least one member selected from the group consisting of an epoxy resin and a phenolic resin.

* * * * *